United States Patent [19]

Braymand

[11] Patent Number: 4,690,270

[45] Date of Patent: Sep. 1, 1987

[54] RAIL-TUBE HOLDER FOR WALKING-BEAM CONVEYOR

[75] Inventor: Robert Braymand, Villefranche Sur Saone, France

[73] Assignee: Societe Nouvelle Baele Gangloff, Vennissieux, France

[21] Appl. No.: 882,276

[22] Filed: Jul. 7, 1986

[30] Foreign Application Priority Data

Jul. 5, 1985 [FR] France ................. 85 10765

[51] Int. Cl.⁴ ............................................. B65G 25/00
[52] U.S. Cl. ..................................................... 198/774
[58] Field of Search ................... 198/774, 775, 776; 414/750

[56] References Cited

U.S. PATENT DOCUMENTS 4,040,514 8/1977 Pielsticker et al. ................. 198/774

FOREIGN PATENT DOCUMENTS 2531044 3/1984 France .

Primary Examiner—Joseph E. Valenza
Assistant Examiner—D. Glenn Dayoan
Attorney, Agent, or Firm—Karl F. Ross; Herbert Dubno

[57] ABSTRACT

The instant invention is a holder used in a walking-beam conveyor having a plurality of beams each formed of a longitudinal row of longitudinally extending and aligned tubes connected together at these holders. Each holder has a stationary base formed with an upwardly open hole and is provided above the hole with a projection extending longitudinally in one direction and fitting complementarily with one of the ends of one of the tubes. A holder element having an upright shaft engageable snugly in the hole and formed with a projection extending longitudinally in a direction opposite to the base projection normally fits complementarily with one of the ends of another of the tubes. A locking member engageable longitudinally between the hole and the holder element presses the holder element longitudinally in the opposite direction against a face of the hole. Vertically overlapping formations on the element and on the face of the hole prevent upward movement of the element in the hole when the element is pressed against the face by the locking member.

13 Claims, 7 Drawing Figures

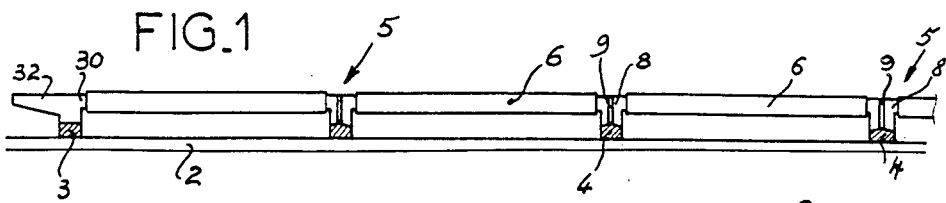
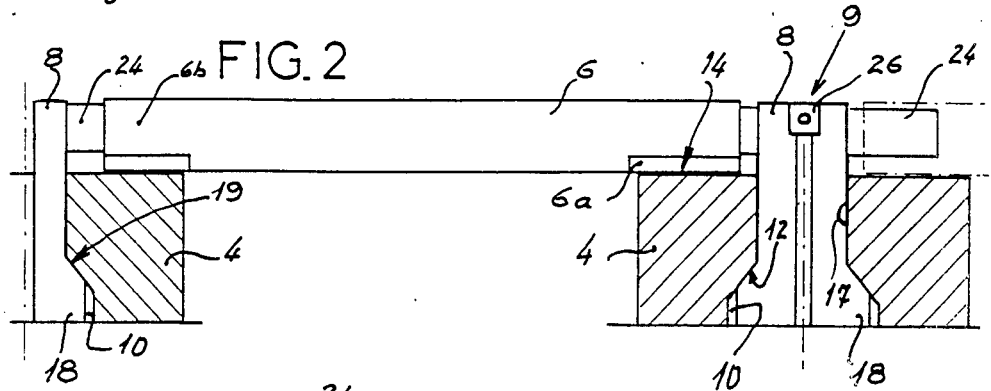
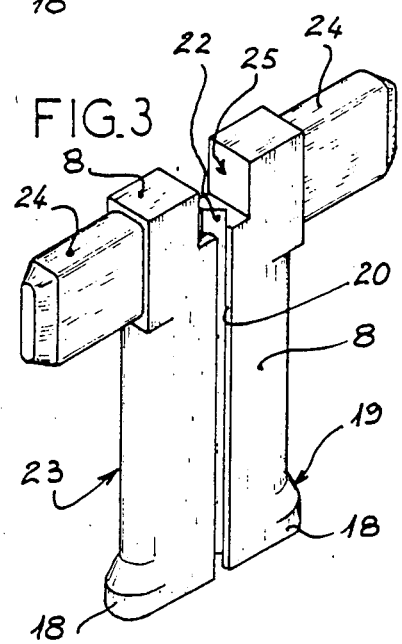
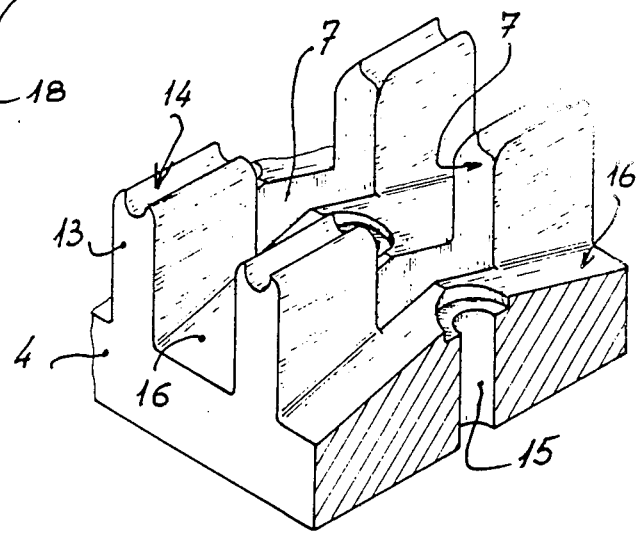

RAIL-TUBE HOLDER FOR WALKING-BEAM CONVEYOR

FIELD OF THE INVENTION

The present invention relates to a walking-beam conveyor. More particularly this invention concerns the rails of such a conveyor.

BACKGROUND OF THE INVENTION

A walking-beam conveyor has a plurality of rails or beams that extend horizontally next to one another. At least one of the rails is fixed and at least one is vertically and horizontally movable. The movable rails describe a quadrilateral motion cycle of up, forward, down, and back so as to lift objects off the stationary rails, advance them one step, drop them back on the stationary rails, and return with the objects sitting on the stationary rails.

French patent No. 2,531,044 describes such a conveyor used for moving bottles. It has rails whose carrying surfaces are each made of a succession of identical stainless-steel tubes that are fitted to mounts themselves fixed on the respective rail. Such a system is quite light, and the stainless-steel tubes are extremely resistant to corrosion.

Nonetheless such a system, in particular when used with glass objects which create very sharp and abrasive particles when broken, is subjected to substantial mechanical wear so that periodically some tubes have to be replaced. To replace about ten tubes in the middle of a beam 10 m long it is often necessary to take out several hundred tubes between the worn tubes and the closer end of the beam. This is a cumbersome job and one that is particularly irksome when an accident or the like has only damaged one of the tubes.

OBJECTS OF THE INVENTION

It is therefore an object of the present invention to provide an improved tube holder for a walking-beam conveyor.

Another object is the provision of such a tube holder for a walking-beam conveyor which overcomes the above-given disadvantages, that is which makes it easy to remove even a single tube without the use of tools and without having to remove any other tubes.

SUMMARY OF THE INVENTION

The instant invention is a holder used in a walking-beam conveyor having a plurality of beams each formed of a longitudinal row of longitudinally extending and aligned tubes connected together at these holders. Each holder has a stationary base formed with an upwardly open hole and provided above the hole with a projection extending longitudinally in one direction and fitting complementarily with one of the ends of one of the tubes. A holder element having an upright shaft engageable snugly in the hole and formed with a projection extending longitudinally in a direction opposite to the base projection normally fits complementarily with one of the ends of another of the tubes. A locking member engageable longitudinally between the hole and the holder element presses the holder element longitudinally in the opposite direction against a face of the hole. Vertically overlapping formations on the element and on the face of the hole prevent upward movement of the element in the hole when the element is pressed against the face by the locking member.

This construction makes it possible to remove any single tube simply by withdrawing at least one locking member and then pulling out the respective holding element, whereupon a tube can be disengaged and replaced. Only the tube needing replacing need be moved; all the other tubes remain undisturbed.

According to another feature of this invention at least one of the bases is provided in its hole with another such element whose projection is the base projection. It is also possible for the other such element to be integral with the respective base, that is either formed unitarily of one pierce therewith, or to be solidly and semipermanently connected thereto.

Normally according to this invention the other such element is separable from the respective base. Thus the locking element is wedged like in a lewis between the two locking elements to secure them in place against any type of movement relative to the base. In such an arrangement each holder element has a back face turned toward the other element of the respective pair and formed with a vertical groove open toward the other element. The locking member is engageable in the grooves between the elements.

The faces of the holes according to this invention are concave toward each other and the holder elements have complementary front faces normally flatly engaged therewith. The formations include a bump formed on each front face of each holder element and a generally complementary recess formed in the end faces of the holes. The bumps can also be on each end face of each hole the recesses in the respective front faces of the holder elements. These bumps and recesses have inclined parts urging the elements down when same are pressed against the end faces. Thus the elements are locked tightly in place in the bases.

Each base according to this invention engages without play in the respective end of the respective tube. For very solid mounting of the tubes each base is formed underneath each of the respective projections with an upwardly open seat in which sits the end of the tube engaged with the respective projections. In addition each base has a plurality of such holes spaced transversely apart and receiving respective pairs of elements carrying respective tubes.

DESCRIPTION OF THE DRAWING

The above and other features and advantages will become more readily apparent from the following, reference being made to the accompanying drawing in which:

FIG. 1 is a side elevational view illustrating a beam or rail of a walking-beam conveyor according to this invention;

FIG. 2 is a large-scale cross section through a detail of FIG. 1;

FIG. 3 is a perspective view of a pair of holder elements according to the invention;

FIG. 4 is a perspective view of a holder base according to the invention;

SPECIFIC DESCRIPTION

Figure 5:
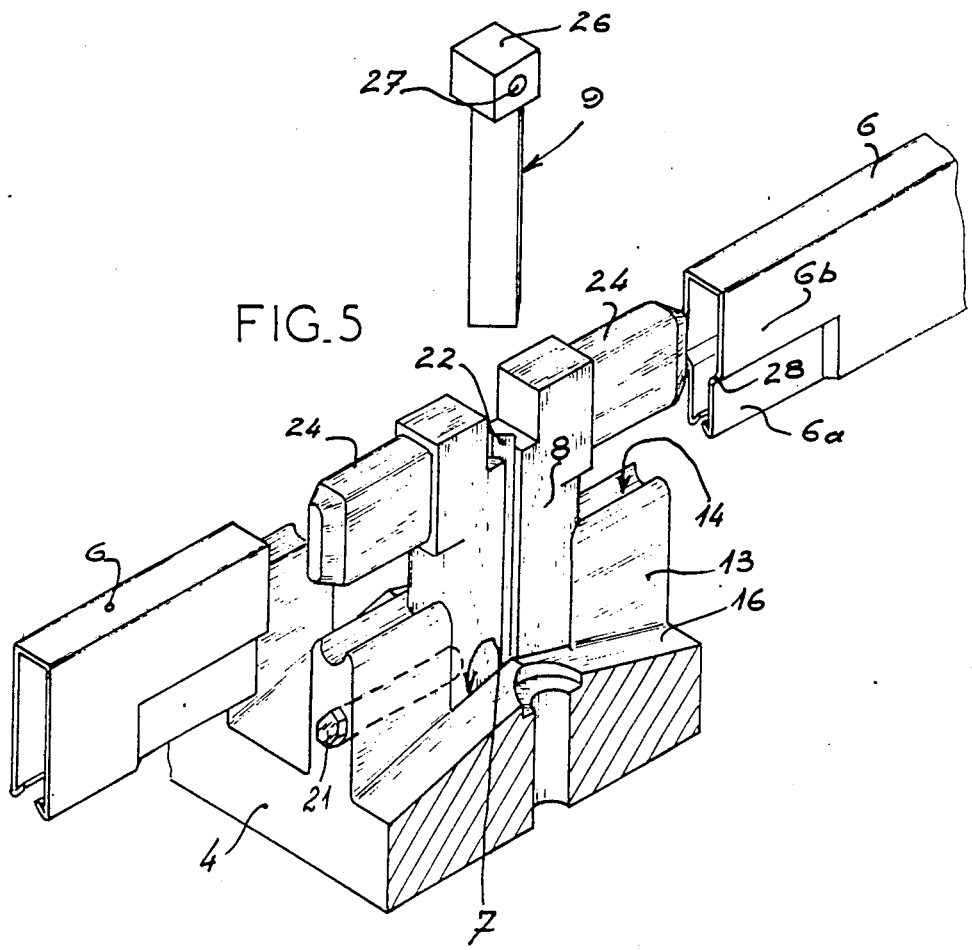
FIG. 5 is an exploded view of the holder assembly in accordance with the invention.

As seen in FIG. 1 a beam of a walking-beam conveyor has a chassis 2 on which are fixed end holders 3 (only one visible) and intermediate holders 5 joining succeeding stainless-steel tubes 6. This beam can be one of the fixed or one of the moving beams of the banks of beams forming the walking-beam conveyor according to this invention. The tubes 6 are of thin-wall but very strong stainless steel and have a generally rectangular section. Each end of each tube 6 is pinched in at 6a to form shoulders 28 delimiting an upper rectangular-section end portion 6b into which parts of the holders 3 and 5 fit as described below.

As is known the rows or groups of rows of the tubes 6 are alternately fixed and movable. Thus objects supported on the horizontal plane formed by the upper edges of the fixed tubes 6 are lifted and stepped horizontally as the movable tubes 6 raise and advance horizontally above this plane, and are set back down on the fixed tubes 6 when the movable tubes 6 drop and retract horizontally back beneath this plane.

The end supports 3 are simple T-shaped castings each having a pointed intake or output arm 32 extending longitudinally away from the row of longitudinally aligned tubes 6 and an opposite arm 30 that fits complementarily into the respective end of the end tube 6.

The intermediate holders 5 according to this invention are formed as cast-metal bases 4 formed with countersunk bores 15 so that they can be bolted to the respective chassis 2 and are each formed at each row of tubes 6 with a longitudinally elongated upwardly open socket hole 7. The ends of each hole 7 are semicylindrical, centered on respective vertical and parallel axes, and concave toward each other and the sides extend longitudinally, vertically, and parallel to each other therebetween. Each such socket hole 7 receives a pair of identical holder elements 8 and a single locking pin 9.

Furthermore, each hole 7 is undercut at each longitudinal end of its lower end to form an outwardly stepped inset 10 connected via a tapered wall region 12 to the rest of the passage. The base 4 is formed in longitudinal line with each end of each hole 7 with a unitary ridge 23 formed with an upwardly concave seat groove 14.

Each holder element 8 is of a form generally complementary to slightly less than half of the hole 7, having a part-cylindrical outer surface 23 complementary to the hole end and a lateral projection 18 and connecting surface 19 complementary to the respective inset 10 and wall region 12. The opposite longitudinal edge 20 of each holder element 8 is planar and formed with an outwardly open groove 22 that is here triangular in section.

At its upper end each element 8 is formed at the groove 22 and face 20 with another inset 25, and opposite thereto with a plug 24 shaped to fit snugly and complementarily into the end 6b (see FIG. 2) of the respective tube 6. The upper surfaces 16 of the base 4 between the ridges 13 incline downwardly away from the longitudinal center so that any glass chips or the like that fall on the bases 4 will slide therefrom and move out of harm's way.

The lewis pin 9 is of square section with a square head 26 formed with a throughgoing hole 27.

To assemble the beam according to this invention for one of the intermediate tubes 6, that is a tube 6 that is between two supports 5, the projections 24 of two elements 8 are fitted into the ends 6b of the tube 6 so that they point longitudinally toward each other. Then the two elements 8 are dropped into the respective holes 7. When two such elements 8 have been fitted one such hole 7 a lewis pin 9 is pushed down into the confronting grooves 22 until its head 26 seats in the setbacks 25. This action pushes the two elements 8 of the same hole 7 apart into tight longitudinal contact at the faces 23 and with the inclined surfaces 12 and 19 abutting. Thus the two elements 8 are tightly confined horizontally in all directions by each other and the hole 7, are prevented from being pulled upward out of the holes by the projection 18 engaging in the inset 10 (FIG. 1), and are prevented from being pushed down by the chassis 2.

The end tubes 6 are first fitted to the arms 30 and then their opposite ends are fitted with elements 8 and dropped down in the end holes 7.

Any single tube 6 can be removed normally by pulling out its two lewis pins 9 and then simply lifting it up and out of its holes 7. The adjacent tubes 6 need not be disturbed.

One of the elements 8 can be unitary or integral with the respective base 4. It is also possible to provide a bolt 21 that intergrally secures one such element 8 in each such hole 7. This construction reduces the number of parts and somewhat facilitates use.

In another arrangement according to the invention the same functions of longitudinal shifting and blocking of the holder element are obtained by use of a bump 17 (FIG. 2) projecting into the bore 7 and extending into a complementary recess of the stationary element 8 and having a lower face inclined like the surfaces 12 and 19.

It would also be possible according to the invention to insert the tube ends into the projections 24. In either case the upper surfaces of the elements 8 and of the head 26 of the member 9 are coplanar with the upper edges of the tubes 6 to present a relatively uninterrupted surfaces for the objects being stepped on the walking beam conveyor.

Figure 6:
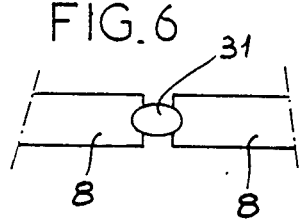
FIGS. 6 and 7 are mainly schematic top views of further holder configurations in accordance with the invention.
Figure 7:
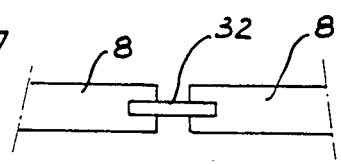

Similarly as seen in FIGS. 6 and 7 an oval-section lewis pin 31 or a rectangular section pin 32 can be used, with complementary grooves in the elements 8, of course.

I claim:

1. In a walking-beam conveyor having a plurality of beams each formed of a longitudinal row of longitudinally extending and aligned tubes connected together at holders, the improvement wherein each holder comprises:
   a stationary base formed with an upwardly open hole and provided above the hole with a projection extending longitudinally in one direction and fitting complementarily with one of the ends of one of the tubes;
   a holder element having an upright shaft engageable snugly in the hole and formed with a projection extending longitudinally in a direction opposite to the base projection and normally fitting complementarily with one of the ends of another of the tubes;
   a locking member engageable longitudinally between the hole and the holder element and pressing the holder element longitudinally in the opposite direction against a face of the hole; and
   vertically overlapping formations on the element and on the face of the hole preventing upward movement of the element in the hole when the element is pressed against the face by the locking member.

2. The conveyor beam defined in claim 1 wherein at least one of the bases is provided in its hole with another said holder element whose projection is the base projection.

3. The conveyor beam defined in claim 2 wherein the other said holder element is integral with the respective base.

4. The conveyor beam defined in claim 2 wherein the other said holder element is separable from the respective base.

5. In a walking-beam conveyor having longitudinally extending alternately supporting beams the improvement in at least one of the beams comprising:
- a longitudinal row of longitudinally extending and aligned tubes;
- a plurality of like stationary bases each formed with an upwardly open hole having a pair of longitudinally opposite end faces;
- a pair of like holder elements at each base, each element having an upright shaft engageable snugly in the hole and formed with longitudinally extending projection, the projections of each pair being directed longitudinally in line with but away from each other, each projection being complementarily engageable with one of the ends of a respective one of the tubes;
- respective locking members engageable in each hole longitudinally between the respective holder elements and pressing the holder elements longitudinally in the opposite direction against the respective faces of the respective hole; and
- vertically overlapping formations on the elements and on the faces of the holes preventing upward movement of the elements in the holes when the elements are pressed against the faces by the respective locking members.

6. The conveyor beam defined in claim 5 wherein each holder element has a back face turned toward the other element of the respective pair and formed with a vertical groove open toward the other element, the locking member being engageable in the grooves between the elements.

7. The conveyor beam defined in claim 5 wherein the faces of the holes are concave toward each other and the holder elements have complementary front faces normally flatly engaged therewith.

8. The conveyor beam defined in claim 7 wherein the formations include a bump formed on each front face of each holder element and a generally complementary recess formed in the end faces of the holes.

9. The conveyor beam defined in claim 7 wherein the formations include a bump formed on each end face of each hole and a generally complementary recess formed in the respective front faces of the holder elements.

10. The conveyor beam defined in claim 7 wherein the formations include interfitting bumps and recesses on the end and front faces having inclined parts urging the elements downward when same are pressed against the end faces.

11. The conveyor beam defined in claim 5 wherein each projection engages without play in the respective end of the respective tube.

12. The conveyor beam defined in claim 5 wherein each base is formed underneath each of the respective projections with an upwardly open seat in which sits the end of the tube engaged with the respective projections.

13. The conveyor beam defined in claim 5 wherein each base has a plurality of such holes spaced transversely apart and receiving respective pairs of elements carrying respective tubes.

* * * * *